(12) United States Patent
Furuya et al.

(10) Patent No.: US 7,120,322 B2
(45) Date of Patent: Oct. 10, 2006

(54) PHOTONIC CRYSTAL DEVICE

(75) Inventors: Hiroyuki Furuya, Nara (JP); Akira Enokihara, Nara (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 11/246,156

(22) Filed: Oct. 11, 2005

(65) Prior Publication Data

US 2006/0034577 A1 Feb. 16, 2006

Related U.S. Application Data

(63) Continuation of application No. PCT/JP05/09071, filed on May 18, 2005.

(30) Foreign Application Priority Data

May 20, 2004 (JP) .............................. 2004-149973

(51) Int. Cl.
- *G02F 1/295* (2006.01)
- *G02B 6/00* (2006.01)
- *G02B 6/10* (2006.01)

(52) U.S. Cl. ........................ 385/8; 385/122; 385/129; 385/131

(58) Field of Classification Search ............... 385/8, 385/122, 129, 131
See application file for complete search history.

(56) References Cited

U.S. PATENT DOCUMENTS

| 6,101,300 | A  | 8/2000  | Fan et al. |
| 6,643,439 | B1 | 11/2003 | Notomi et al. |

(Continued)

FOREIGN PATENT DOCUMENTS

| EP | 1 489 442 A1 | 12/2004 |
| JP | 2002-196296 A | 7/2002 |
| JP | 2004-012781 A | 1/2004 |
| JP | 2004-045924 | 2/2004 |
| WO | WO 03/081304 A1 | 10/2003 |

OTHER PUBLICATIONS

Joannopoulos, J.D., et al. "Photonic Crystals." Princeton University Press, 1995, Chapter 1, pp. 3-7, Chapter 4, pp. 38-53, Reference cited in [0003], p. 2 of the specification.

(Continued)

*Primary Examiner*—Brian Healy
*Assistant Examiner*—Jerry Martin Blevins
(74) *Attorney, Agent, or Firm*—McDermott Will & Emery LLP

(57) ABSTRACT

A photonic crystal device according to the present invention includes: a substrate 201; a periodic structure portion 206 formed in or on the substrate 201, the periodic structure portion 206 having a plurality of holes 2050 and 2051 arranged in a periodic array; at least one optical waveguide 202 formed in or on the substrate 201, the at least one optical waveguide 202 being adjacent to the periodic structure portion 206; and at least one optical resonator 203 formed in or on the substrate 201, the at least one optical resonator 203 being formed in a position away from the optical waveguide 202, with at least one hole 2051 among the plurality of holes 2050 and 2051 of the periodic structure portion 206 being interposed between the optical resonator 203 and the optical waveguide 202. The plurality of holes 2050 and 2051 of the periodic structure portion 206 include a hole 2050 having a depth different from a depth of the at least one hole 2051 interposed between the optical waveguide and 202 the optical resonator 203.

10 Claims, 11 Drawing Sheets

U.S. PATENT DOCUMENTS

| | | |
|---|---|---|
| 2002/0009277 A1* | 1/2002 | Noda et al. ............... 385/130 |
| 2002/0021878 A1* | 2/2002 | Allan et al. ............... 385/129 |
| 2002/0122648 A1* | 9/2002 | Mule' et al. ............... 385/129 |
| 2004/0179803 A1 | 9/2004 | Bourelle |
| 2004/0184754 A1* | 9/2004 | Noda et al. ............... 385/129 |
| 2005/0146778 A1* | 7/2005 | Noda et al. ............... 359/321 |
| 2005/0147371 A1 | 7/2005 | Noda et al. |
| 2005/0152656 A1* | 7/2005 | Talneau et al. ............ 385/129 |

OTHER PUBLICATIONS

Chutinan, A., et al. "Waveguides and waveguide bends in two-dimensional photonic crystal slabs." Physical Review :B, vol. 62, No. 7, 2000, pp. 4488-4492, Reference cited in [0005], p. 2 of the specification.

Akahane, Yoshihiro., et al. "Investigation of high-Q channel drop filters using donor-type defect in two-dimensional photonic crystal slabs." Applied Physics Letters, vol. 83, No. 8, 2003, pp. 1512-1514, Reference cited in [0005], p. 3 of the specification.

Akahane, Yoshihiro., et al. Fine-tuned high-Q photonic-crystal nanocavity. Optics Express, vol. 13, No. 4, 2005, pp. 1202-1214, Reference cited in [0005], p. 3 of the specification.

Akahane, Yoshihiro., et al. "Development of High-Q Photonic Nanocavity Using Two-Dimensional Photonic Crystal Slabs." SEI Technical Review, No. 59, Jan. 2005, pp. 21-26.

Akahane, Yoshihiro., et al. "Two-dimensional photonic-crystal-slab channel-drop filter with flat-top response." Optics Express, vol. 13, No. 7, Apr. 2005, pp. 2512-2530.

* cited by examiner

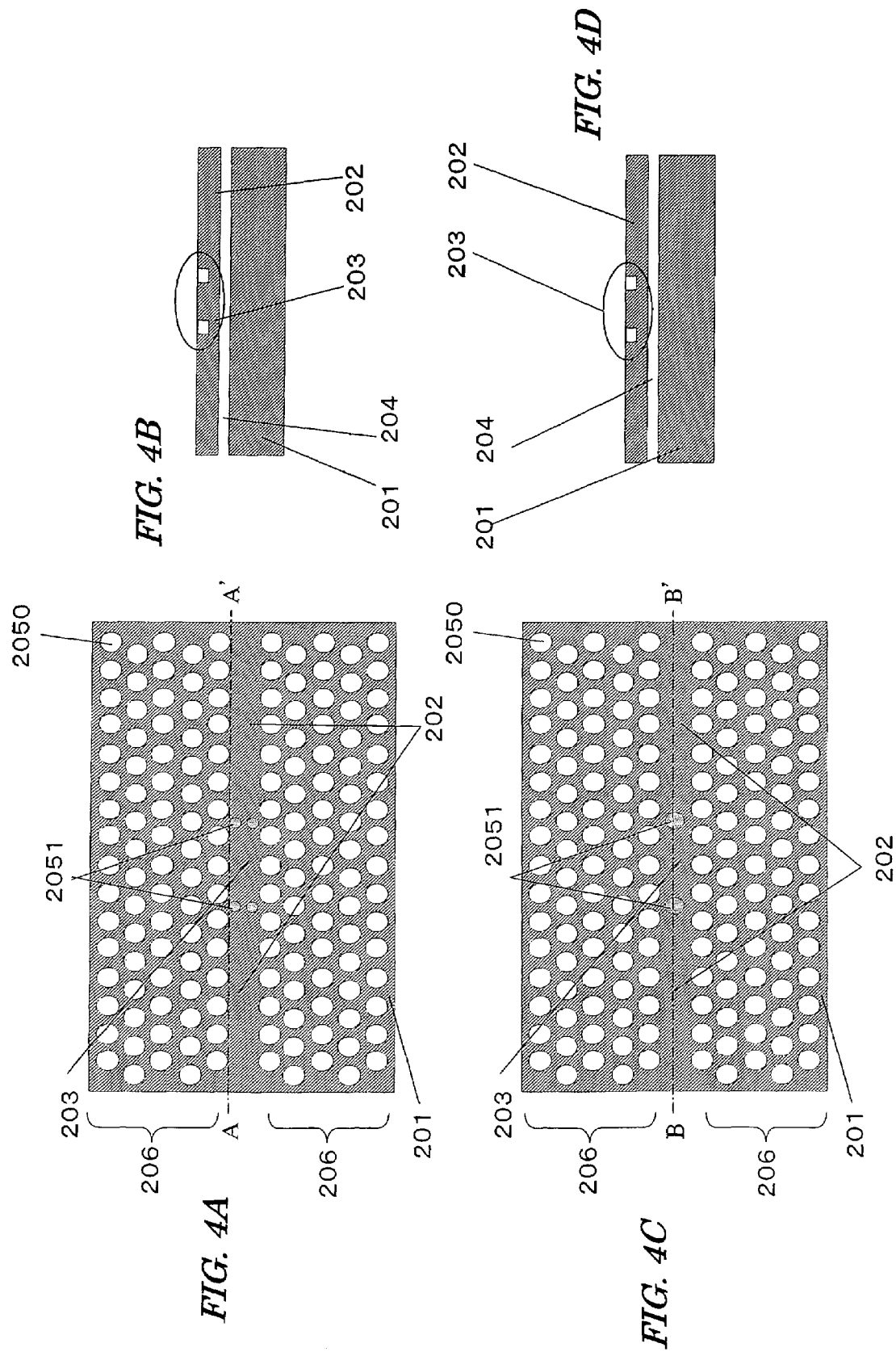

PHOTONIC CRYSTAL DEVICE

This Application is a continuation of International Application No. PCT/JP2005/009071, whose international filing date is May 18, 2005, which in turn claims the benefit of Japanese Patent Application No. 2004-149973, filed on May 20, 2004, the disclosures of which Applications are incorporated by reference herein. The benefit of the filing and priority dates of the International and Japanese Applications is respectfully requested.

BACKGROUND OF THE INVENTION

1. Field of the Invention

The present invention relates to a photonic crystal device, and in particular to a photonic crystal device which includes an optical waveguide and an optical resonator.

2. Description of the Related Art

In a periodic refractive index modulation structure which is formed within a dielectric or a semiconductor, electromagnetic waves such as light are susceptible to periodic perturbations. Therefore, a light band structure ("photonic band structure") whose relationship between wave number and frequency (dispersion relationship) is similar to that of a band structure of electrons within a crystal is formed. Such a periodic refractive index modulation structure is called a photonic crystal (J. D. Joannopouls et al., "Photonic crystals", Princeton University Press, 1995). Light propagation in a photonic crystal can be controlled based on the material and the photonic crystal structure.

Optical waveguides to which a photonic crystal structure is applied are attracting much attention as a technique which enables downsizing of optical circuit devices. In an optical waveguide which utilizes a photonic crystal structure, what is important is the refractive index difference between the optical waveguide portion and the periodic structure portion. Therefore, there have been many reports of examples of photonic crystals produced from a combination of a high refractive index material whose refractive index is 3 or more, such as gallium arsenide (refractive index: 3.6) or silicon (refractive index: 3.4), and a low refractive index material such as silicon dioxide (refractive index: 1.5) or air (refractive index: 1) (see, for example, Japanese Laid-Open Patent Publication No. 2002-350657).

Chutinan et al., Physical Review B, vol. 62, No. 7, p4488, 2000, discloses an optical waveguide in which a photonic band is created by forming a periodic array of cylindrical air holes in a semiconductor substrate, thus providing an optical path which is bent perpendicularly. Y. Akahane et al., "Investigation of high-Q channel drop filters using donor-type defects in two-dimensional photonic crystal slabs", Applied Physics Letters, vol. 83, p. 1512, 2003, discloses an optical resonator of a size of a light wavelength, which is produced by utilizing a photonic crystal. Y. Akahane et al., "Fine-tuned high-Q photonic crystal nanocavity", OPTICS EXPRESS, vol. 13, No. 4 p. 1202, 2005, discloses a photonic crystal device which includes an optical resonator and an optical waveguide.

Hereinafter, with reference to FIG. 1, a conventional photonic crystal device which is produced by using a photonic crystal structure will be described.

FIG. 1 is an upper plan view of a two-dimensional photonic crystal device. In this two-dimensional photonic crystal device, a two-dimensional photonic crystal is formed by arraying a multitude of air holes 102 in a semiconductor (silicon) layer of an SOI (Silicon-On-Insulator) substrate 101. The photonic crystal has a photonic band structure which prevents propagation of light within a specific wavelength band. A photonic crystal device as shown in FIG. 1 can be produced by, for example, arraying air holes (having a diameter of 240 nm) at intervals of 420 nm on a slab (having a thickness of 250 nm), so as to form a triangular lattice.

The substrate 101 has a linear portion in which no air holes 102 are formed, the linear portion functioning as an optical waveguide 103. The optical waveguide 103 is a line defect in the photonic crystal. That is, no photonic band structure is present in the optical waveguide 103.

At a position which is at least one air hole 102 away from the optical waveguide 103, there exists a space 104 in which no air holes 102 are formed. This space 104 consists of point defects in the photonic crystal, and functions as a very small sized optical resonator, having a size on the order of a light wavelength. The optical resonator length is an integer multiple of the diameter of the air holes 102. Out of the light which propagates through the optical waveguide 103, light within a specific wavelength region resonates in the space 104. Since the space 104 is enclosed by the surrounding photonic crystal, the space 104 can exhibit a high Q value as an optical resonator. The illustrated photonic crystal device can be utilized in various devices such as optical filters and semiconductor lasers.

A diagram (FIG. 5) from Y. Akahane et al., "Fine-tuned high-Q photonic crystal nanocavity", OPTICS EXPRESS, vol. 13, No. 4 p. 1202, 2005, supra, is shown in FIG. 11. FIG. 11 is a graph whose vertical axis represents optical intensity (Intensity: arbitrary unit) and whose horizontal axis represents wavelength (Wavelength: nm). In FIG. 11, (a) shows the intensity of light which is transmitted and propagates through the optical waveguide, whereas (b) shows the intensity of light which is radiated to the outside through the optical resonator. The light which is radiated to the outside of the substrate through the optical resonator has a narrow spectrum at a resonant wavelength, the resonant wavelength being controllable by adjusting the resonator length. In such a photonic crystal device, by adjusting the degree of coupling between the optical resonator and the optical waveguide, it becomes possible to control the intensity of the light which is radiated to the outside through the optical resonator.

In the conventional photonic crystal device shown in FIG. 1, the resonant frequency is controlled by adjusting the length of the space 104 functioning as an optical resonator. On the other hand, the degree of optical coupling ("matching") between the optical resonator (space 104) and the optical waveguide 103 is adjusted based on the distance between the space 104 and the optical waveguide 103. However, this distance is set to be an integer multiple of the pitch of the air holes (lattice constant), and therefore it is difficult to realize a precise adjustment of the degree of optical coupling. Therefore, it has been impossible to arrive at a design which simultaneously realizes desired values for the Q value, matching, and resonant frequency of the optical resonator.

SUMMARY OF THE INVENTION

In order to overcome the problems described above, preferred embodiments of the present invention provide a photonic crystal device which is capable of realizing, with an improved accuracy, an adjustment of the matching between an optical waveguide and an optical resonator.

A photonic crystal device according to the present invention comprises: a substrate; a periodic structure portion formed in or on the substrate, the periodic structure portion having a plurality of holes arranged in a periodic array; at least one optical waveguide formed in or on the substrate, the at least one optical waveguide being adjacent to the periodic structure portion; and at least one optical resonator formed in or on the substrate, the at least one optical resonator being formed in a position away from the optical waveguide, with at least one of the plurality of holes of the periodic structure portion being interposed between the optical resonator and the optical waveguide, wherein the plurality of holes of the periodic structure portion include a hole having a depth different from a depth of the at least one hole interposed between the optical waveguide and the optical resonator.

In a preferred embodiment, the plurality of holes of the periodic structure portion include a hole having a depth greater than a depth of the at least one hole interposed between the optical waveguide and the optical resonator.

In a preferred embodiment, the plurality of holes of the periodic structure portion include a hole having a radius different from a radius of the at least one hole interposed between the optical waveguide and the optical resonator.

In a preferred embodiment, a waveguiding portion is made of a material having electrooptical effects, the waveguiding portion being a portion of the substrate in which the optical waveguide is at least formed.

In a preferred embodiment, the substrate includes: a waveguiding portion in which the optical waveguide is formed; a base portion supporting the waveguiding portion; and an air gap formed between the waveguiding portion and the base portion.

In a preferred embodiment, the periodic structure portion forms a photonic band at a frequency of light propagating through the optical waveguide.

In a preferred embodiment, the optical waveguide is formed of a line defect in a photonic crystal, and the optical resonator is formed of a point defect in the photonic crystal.

The photonic crystal device may further comprise modulation electrodes provided near the optical waveguide, and functioning as an optical modulator.

In a preferred embodiment, the optical waveguide has a Mach-Zehnder interference type optical waveguide structure.

In a preferred embodiment, on a bottom face of the at least one hole interposed between the optical waveguide and the optical resonator, a film for reducing the depth of the hole is deposited.

In accordance with a photonic crystal structure of the present invention, the degree of coupling between the optical resonator and the optical waveguide is adjusted by adjusting the depths of holes, rather than based on presence/absence of defects in the photonic crystal or shifting of hole positions. As a result, there is provided an increased freedom of adjustment, and it is possible to realize a very small sized optical device which has a low light reflection loss. By applying the photonic crystal device of the present invention to an optical device such as an optical modulator, it becomes possible to reduce the size and enhance the performance of the device.

Other features, elements, processes, steps, characteristics and advantages of the present invention will become more apparent from the following detailed description of preferred embodiments of the present invention with reference to the attached drawings.

BRIEF DESCRIPTION OF THE DRAWINGS

FIG. 4A is a plan view of a photonic crystal device according to a second embodiment of the present invention. FIG. 4B is a cross-sectional view taken at line A–A' in FIG. 4A. FIG. 4C is a plan view showing another structure according to the second embodiment. FIG. 4D is a cross-sectional view taken at line B–B' in FIG. 4C.

DETAILED DESCRIPTION OF PREFERRED EMBODIMENTS (Embodiment 1)

Figure 2A:
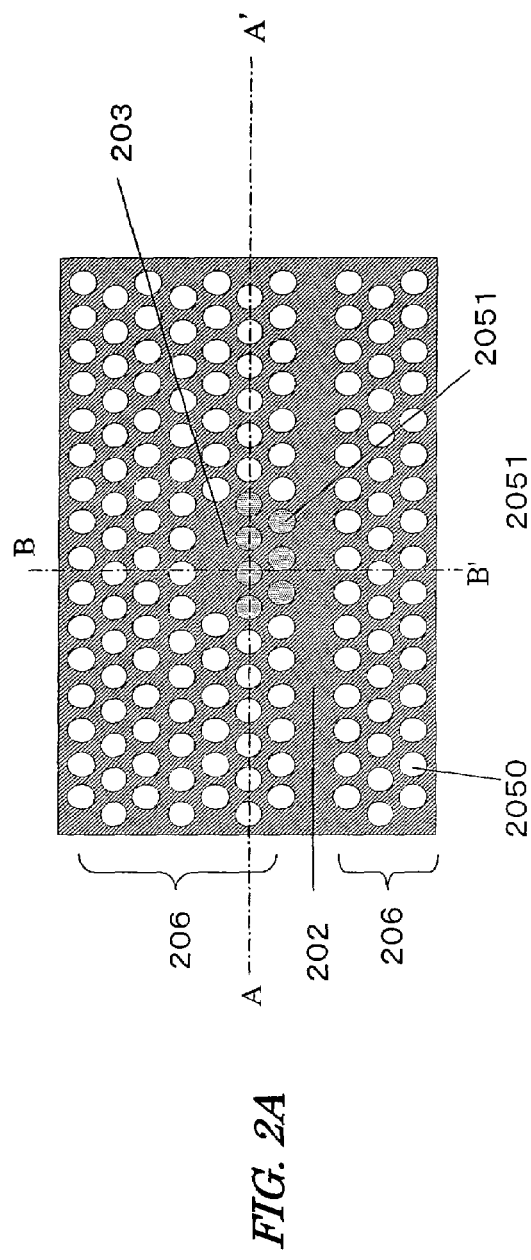
FIG. 2A is a plan view of a photonic crystal device according to a first embodiment of the present invention.
Figure 2B:
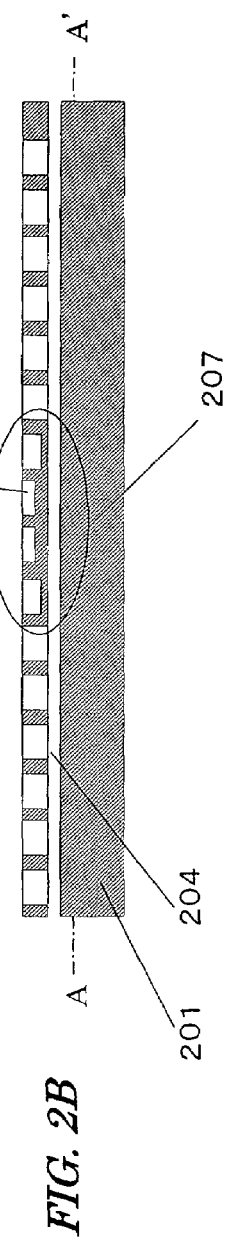
FIG. 2B is a cross-sectional view taken at line A–A' in FIG. 2A.
Figure 2C:
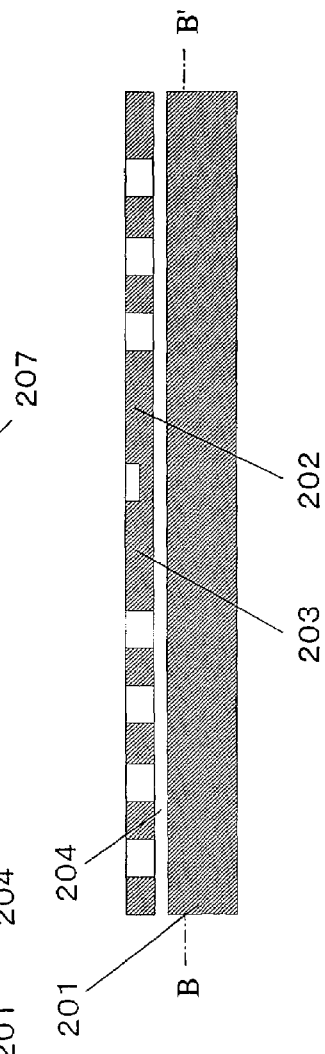
FIG. 2C is a cross-sectional view taken at line B–B' in FIG. 2A.

With reference to FIGS. 2A to 2C, a photonic crystal device according to a first embodiment of the present invention will be described. FIG. 2A is a view showing an upper face of the photonic crystal device of the present embodiment. FIG. 2B is a cross-sectional view taken at line A–A' in FIG. 2A. FIG. 2C is a cross-sectional view taken at line B–B' in FIG. 2A.

The photonic crystal device of the present embodiment includes: a substrate 201; a periodic structure portion 206 which is formed on the substrate 201; an optical waveguide 202 which is disposed adjacent to the periodic structure portion 206; and an optical resonator 203 which is formed in a position away from the optical waveguide 202. The periodic structure portion 206 has a plurality of holes 2050 which are arranged in a two-dimensional and periodic manner along a principal face of the substrate 201. The optical resonator 203 is formed in a position away from the optical waveguide 202, with at least one hole 2051 interposed between the optical resonator 203 and the optical waveguide 202.

In the present embodiment, four holes 2051 are located in a region interposed between the optical waveguide 202 and the optical resonator 203, the holes 2051 having a different depth from the depth of the holes 2050 located in the other regions. In the present embodiment, by adjusting the depth of the holes 2051 present in the region interposed between the optical resonator 203 and the optical waveguide 202, the degree of coupling between the optical resonator 203 and the optical waveguide 202 is controlled. The holes 2050 located in any region other than the region interposed between the optical waveguide 202 and the optical resonator 203 have substantially the same depth with respect to one another. However, it is not required that all of the multitude of holes 2050 have exactly the same depth.

Hereinafter, the structure of the photonic crystal device of the present embodiment will be described in more detail.

The substrate 201 used in the present embodiment can suitably be made of a semiconductor or dielectric material. Examples of semiconductor materials include Si, Ge, $Si_{1-x}Ge_x$, GaAs, InP, and GaN. Examples of suitable dielectric materials include sapphire, lithium niobate ($LiNbO_3$), lithium tantalate ($LiTaO_3$), and potassium titanate ($KTiOPO_4$). The substrate 201 does not need to be made of a single material, but may include a plurality of layers of semiconductor or dielectric. The substrate 201 may be an SOI substrate, for example.

The periodic structure portion 206, which is obtained by arranging the plurality of holes 2050 in a two-dimensional array on the upper face of the substrate 201, constitutes a photonic crystal structure. Although the present embodiment illustrates cylindrical holes 2050 and 2051, the holes may have any other shape.

In the present embodiment, air is present inside the holes 2050 and 2051, thus creating a difference in equivalent refractive index with respect to the substrate 201. The array of holes 2050 and 2051 causes a periodic refractive index modulation in a plane which is parallel to the upper face of the substrate 201, thus creating a photonic band structure with respect to electromagnetic waves. Although the inside of the holes 2050 and 2051 may alternatively be filled with any material other than air, it is necessary that the material filling the holes 2050 and 2051 has a refractive index which is different from the refractive index of the substrate material. As the refractive index difference between the substrate 201 and the inside (i.e., "air" in the present embodiment) of the holes 2050 and 2051 increases, a broader range of adjustment for the equivalent refractive index is obtained (as realized by changing the depth of the holes 2051), which is preferable. The refractive index difference between the substrate 201 and the inside of the holes 2050 and 2051 can be prescribed to be a value in the range from 2.0 to 0.05. However, it is preferable to realize a refractive index difference of 2.0 to 0.1.

In the present embodiment, an air gap 204 having a thickness of about 1 to 100 μm is provided below the portion (slab-like portion) in which the photonic crystal structure is formed. The air gap 204 is transparent with respect to light of any arbitrary wavelength. A structure in which such an air gap 204 is provided between the portion where the optical waveguide 202 and the optical resonator 203 are formed and the main portion of the substrate may be referred to as an "air bridge structure".

In the present embodiment, by adjusting the depth of the holes 2051, it becomes possible to control the degree of coupling and resonant frequency of the optical resonator with an improved accuracy.

Figure 1:
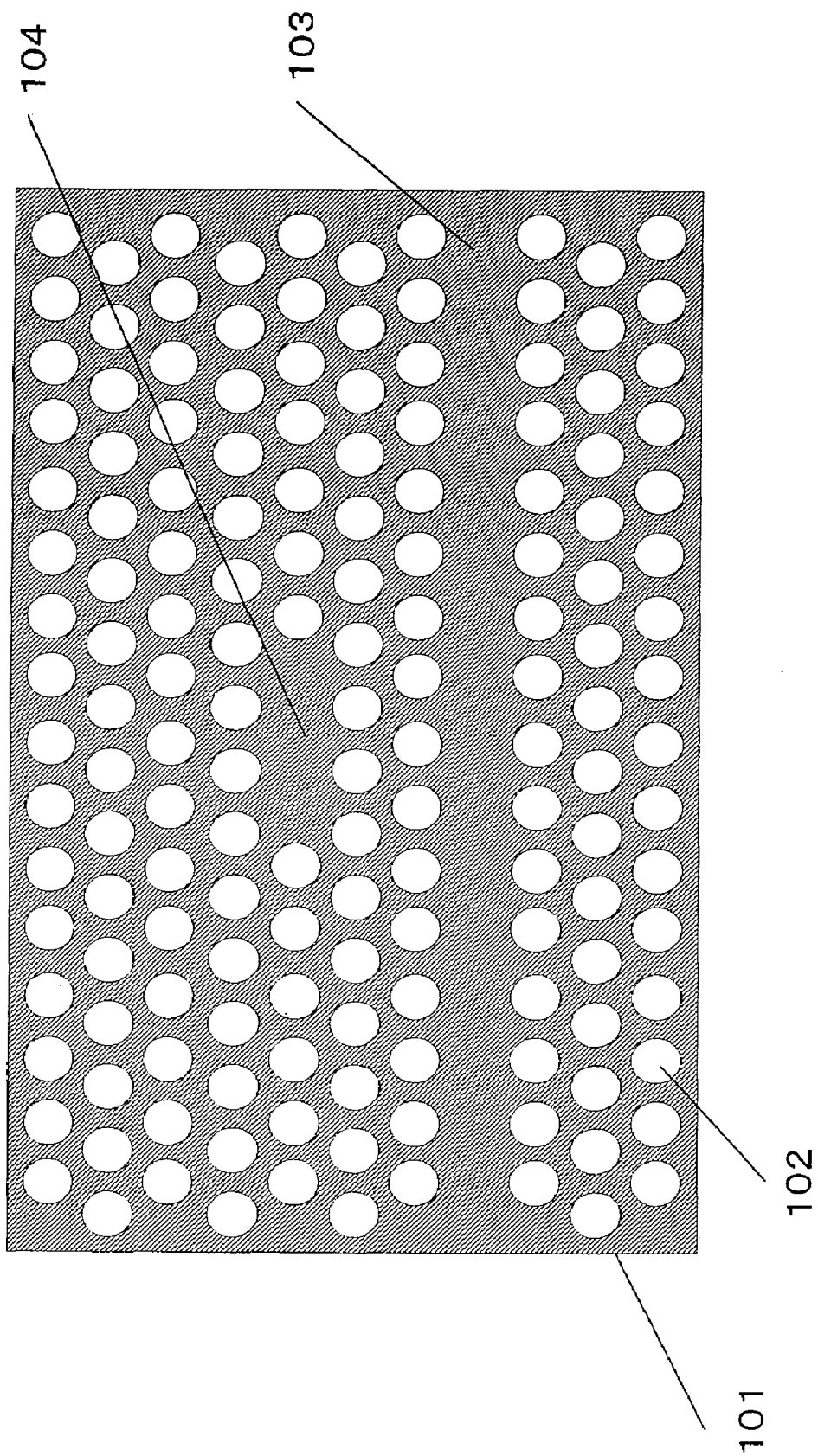
FIG. 1 is a plan view showing a conventional photonic crystal device which includes an optical waveguide and an optical resonator.

On the other hand, in the conventional photonic crystal device described with reference to FIG. 1, the degree of coupling and resonant frequency of the optical resonator are controlled by increasing or decreasing the number of air holes 102. However, since the only controllable parameter in this case is the presence or absence of air holes, there is only a low design freedom, and therefore it is difficult to accurately control the degree of coupling and resonant frequency of the optical resonator.

It is known that, an increase in the Q value of the optical resonator can effectively be attained by shifting the positions of the air holes which are present at both edges of the point defect portion functioning as an optical resonator. However, in order to shift the positions of the air holes, it will be necessary to change the layout of the photomask which is used for forming the air holes via etching. In order to realize a fine adjustment, it will be necessary to prepare a large number of photomasks.

The photonic crystal device shown in FIGS. 2A to 2C has its characteristics (as an optical device) greatly changed in accordance with the degree of coupling between the optical waveguide 202 and the optical resonator 203. The degree of coupling depends on the shape, size, positions, number, etc., of the holes 2051 which are located in the region (light coupling portion) interposed between the optical waveguide 202 and the optical resonator 203. As described above, adjusting the number of holes 2051 can only provide coarse, discrete adjustments. On the other hand, adjusting the shape and positions of the holes 2051 would require a change in the photomask, which is expensive. Each hole 2051 has a dimension along the in-plane or horizontal direction (i.e., diameter) and a dimension along the vertical direction (i.e., depth). Among these dimensions, adjusting the diameter would similarly require a change in the photomask, as in the case of shape adjustment. Therefore, in the first place, no conventional attempts have been made at adjusting the shape, size, positions, number, etc., of the holes 2051 located in the region interposed between the optical waveguide 202 and the optical resonator 203.

As a result, it has been impossible to optimize the degree of coupling between the optical waveguide 202 and the optical resonator 203 to realize an efficient coupling from the optical waveguide 202 to the optical resonator 203. Thus, due to reflection losses or the like, it has been difficult to obtain desired characteristics.

In order to solve the above problems, in the present embodiment, the degree of coupling between the optical waveguide 202 and the optical resonator 203 is controlled by adjusting the depth of the holes 2051. Although adjustment of the depth of the holes 2051 is generally considered as difficult, the present embodiment provides a practical means for accurately adjusting the depth of the holes 2051, according to the method described below.

Hereinafter, with reference to FIGS. 3A to 3D, a preferable embodiment of a method for producing the photonic crystal device of the present embodiment will be described.

Figure 3A:
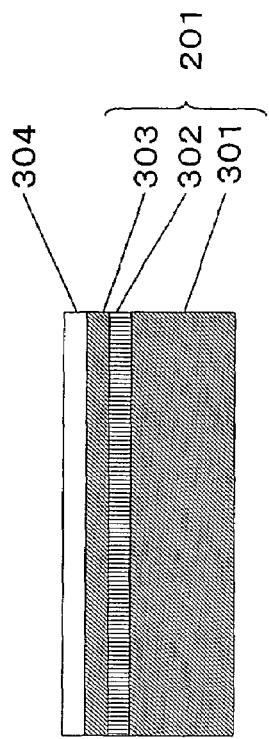
FIGS. 3A to 3D are cross-sectional views showing respective steps of an embodiment of a method for producing a photonic crystal device according to the present invention.

First, a substrate 201 as shown in FIG. 3A is prepared. The substrate 201 has an SOI structure as follows: an Si layer 303 (thickness: 0.5 μm), functioning as a waveguiding portion of the substrate 201, is formed on a silicon substrate 301 which functions as a base portion of the substrate 201, with an SiO₂ layer 302 (thickness: 1 μm) functioning as a sacrificial layer interposed therebetween. In the substrate 201 used in the present embodiment, the SiO₂ layer 302 has a thickness of 1 μm, and the Si layer 303 has a thickness of 0.5 μm; however, the thicknesses of these layers are not limited to the above values.

After the substrate 201 is cleaned, a resist layer 304 for use with electron beam patterning is applied on the upper face of the substrate 201. The resist layer 304 is made of a resist material which allows the thickness of the removed portions (as removed after development) to be controlled based on the irradiation amount (dose) of the electron beam (e.g., a resist which is available from ZEON CORPORATION under the tradename "ZEP-2000"), for example.

Figure 3B:
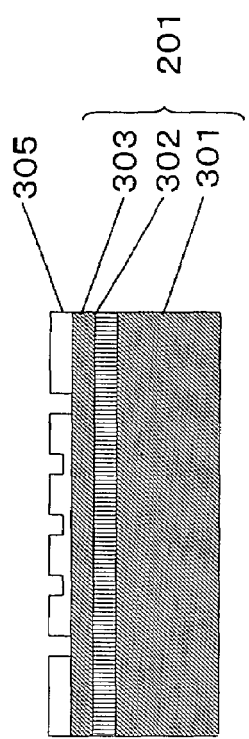

Next, by using an electron beam exposure technique, the portions of the resist layer 304 defining the holes 2050 and 2051 are irradiated with an electron beam, and thereafter a development process is performed. Thus, the portions irradiated with the electron beam are removed, whereby a resist pattern 305 as shown in FIG. 3B is formed. The irradiation amount of the electron beam is adjusted in accordance with the depth (design value) of the holes to be formed. In the present embodiment, any region in which relatively shallow holes are to be formed is irradiated with a smaller dose of electron beam than the dose for any region in which relatively deep holes are to be formed. Therefore, in the region where relatively shallow holes are to be formed, no openings that penetrate through the resist pattern 305 are formed, but some resist remains at the bottom.

Next, by using the resist pattern 305 as a mask, and using a gas such as a chlorine type gas or SF6, holes 306a and 306b are formed.

Figure 3C:
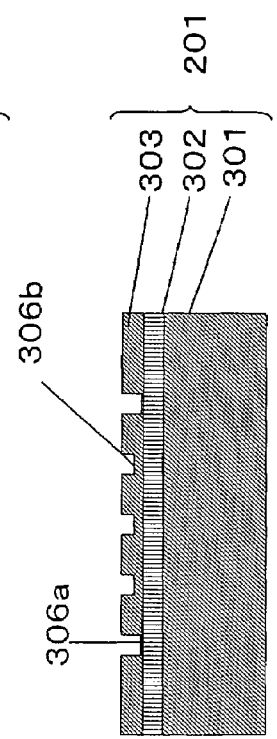
Figure 3D:
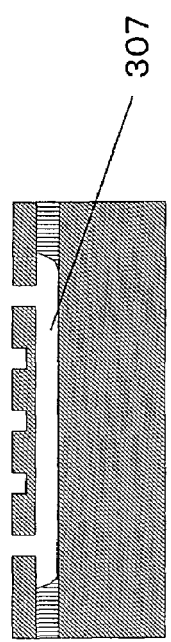

When the holes 306a and 306b having different depths are formed on the Si layer 303 by the above method, the relatively deep holes 306a penetrate through the Si layer 303 and reach the SiO₂ layer 302, as shown in FIG. 3C. Thereafter, the substrate 201 is immersed in hydrofluoric acid, whereby the hydrofluoric acid comes in contact with the SiO₂ layer 302 via the deep holes 306a (which are deep enough to reach the SiO₂ layer 302), thus partially removing the SiO₂ layer 302. As a result, an air gap 307 as shown in FIG. 3D is formed, thus forming an air bridge structure.

Next, with reference to FIGS. 9A to 9D, another embodiment of the production method will be described.

First, by a method substantially similar to the above-described method, a plurality of holes are formed in an Si layer 303 (thickness: 0.5 μm) which is formed on an SiO₂ layer 302 (thickness: 1 μm), which in turn is formed on a silicon substrate 301. These holes are formed by, after forming on the Si layer 303 a resist mask having a pattern that defines the positions and shapes of the holes, subjecting the Si layer 303 to an anisotropic etching. Thereafter, the resist mask is removed to obtain the structure shown in FIG. 9A. In this example, all of the holes have the same depth, and are deep enough to reach the surface of the SiO₂ layer 302.

Figure 9A:
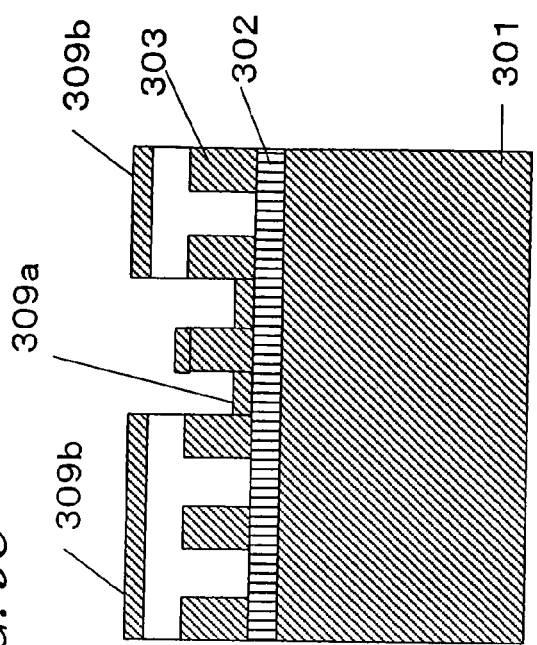
FIGS. 9A to 9D are cross-sectional views showing respective steps of another embodiment of a method for producing a photonic crystal device according to the present invention.
Figure 9B:
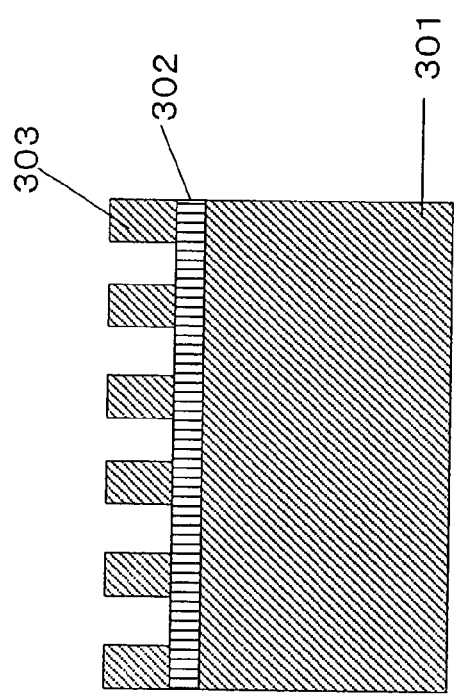

Next, as shown in FIG. 9B, a resist mask 308 having an opening is formed on the Si layer 303. Through the opening of the resist mask 308, holes which are to be formed with a shallower depth than that of the other holes are exposed.

Figure 9C:
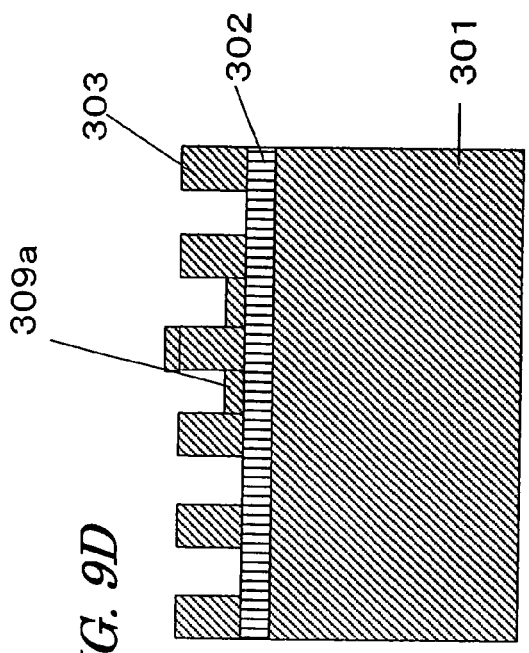
Figure 9D:
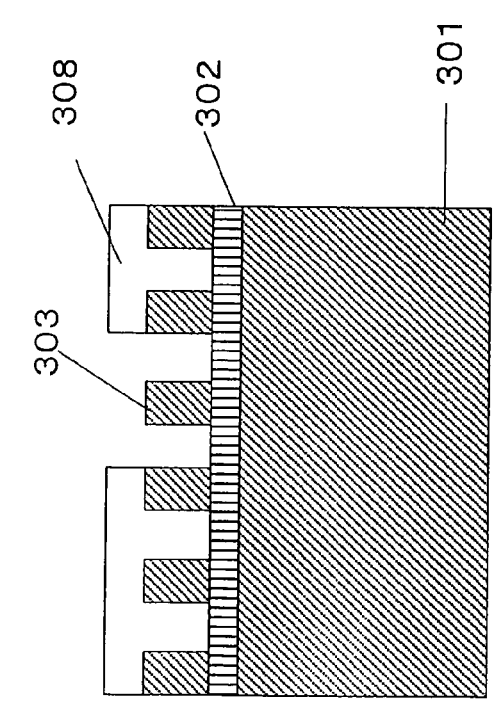

Thereafter, as shown in FIG. 9C, an Si film 309b is deposited on the resist mask 308. Note that the Si film 309a is also deposited in the region exposed through the opening of the resist mask 308.

Next, by removing the resist mask 308, the Si film 309b having been deposited on the resist mask 308 is also removed, whereby the Si film 309a is selectively left in the region corresponding to the opening of the resist mask 308. Thus, the Si film 309a is formed at the bottoms of selected holes, so that the depth of these holes is made relatively shallow.

Although FIG. 9C illustrates a case where no Si film 309a is formed on the side faces of any holes, it will be appreciated that the Si film 309a may be formed also on the side faces of holes, depending on the thin film deposition technique used.

By adjusting the deposition rate and the deposition time, the thicknesses of the Si films 309a and 309b to be deposited can be controlled with a very high accuracy. Thus, through a very accurate adjustment of the depths of the holes located between the optical resonator and the optical waveguide, it becomes possible to control the degree of coupling between the optical resonator and the optical waveguide to a desired degree.

Thereafter, a portion of the Si layer 302 is removed via holes 306a which are deep enough to reach the Si layer 302, whereby an air bridge structure can be formed.

Alternatively, a uniform Si film may be deposited before forming the resist mask 308, and thereafter the resist mask 308 may be formed on this Si film, followed by an etching step. In that case, the portion of the Si film which is exposed through the opening of the resist mask 308 will be etched, i.e., the holes within the opening will become relatively deep. Therefore, in this case, a resist mask 308 having a reversed pattern from that of the resist mask 308 shown in FIG. 9B above is formed, thus allowing the region(s) in which to form deep holes to be exposed through the opening of the resist mask 308.

According to the above method, the depth of a hole in any desired position can be adjusted based on the pattern of the resist mask 308. However, since the hole diameter is small, it may be difficult to differentiate the depth of a single hole from the depth of the other holes, with currently available lithography techniques. For example, in the example shown in FIG. 2A, on a mass-production level, it may not be easy to cause the depth of only the seven holes existing between the optical resonator 203 and the optical waveguide 202 to become smaller than that of the other holes. The reason is that it is difficult to form a minute pattern of openings or the like in a resist mask, and then perform accurate positioning for such a mask.

Figure 10A:
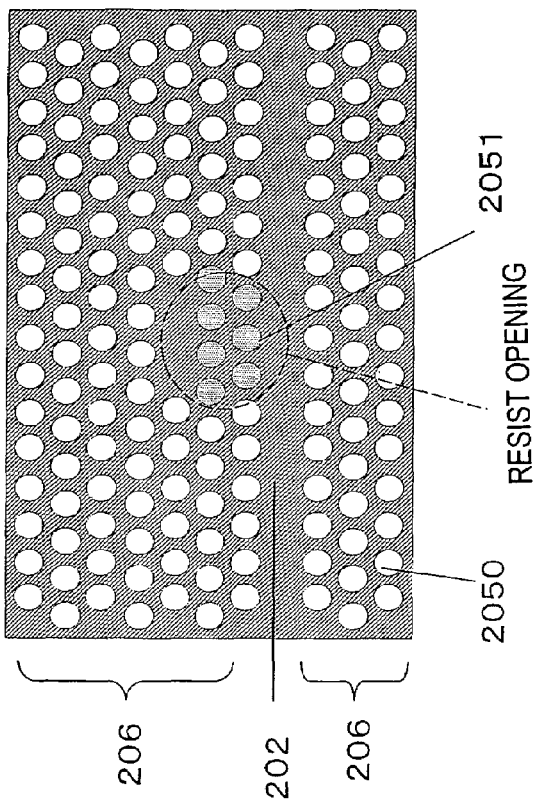
FIGS. 10A and 10B show exemplary arrangements of shallow holes.

FIG. 10A schematically shows an exemplary shape of a resist opening containing seven holes, the resist opening being present between the optical resonator 203 and the optical waveguide 202. In the example shown in FIG. 10A, the edge of the resist opening (shown by the broken line) runs through some holes. In each such hole, the depth may possibly vary depending on the position within the hole. However, the bottom of each hole does not need to be flat. Thus, it is intended that the "depth" of a hole means an average depth within the hole.

Figure 10B:
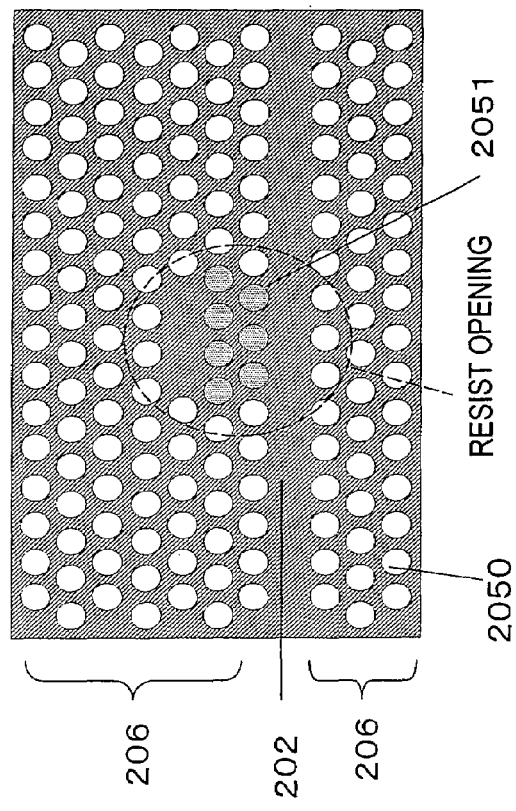
Figure 11:
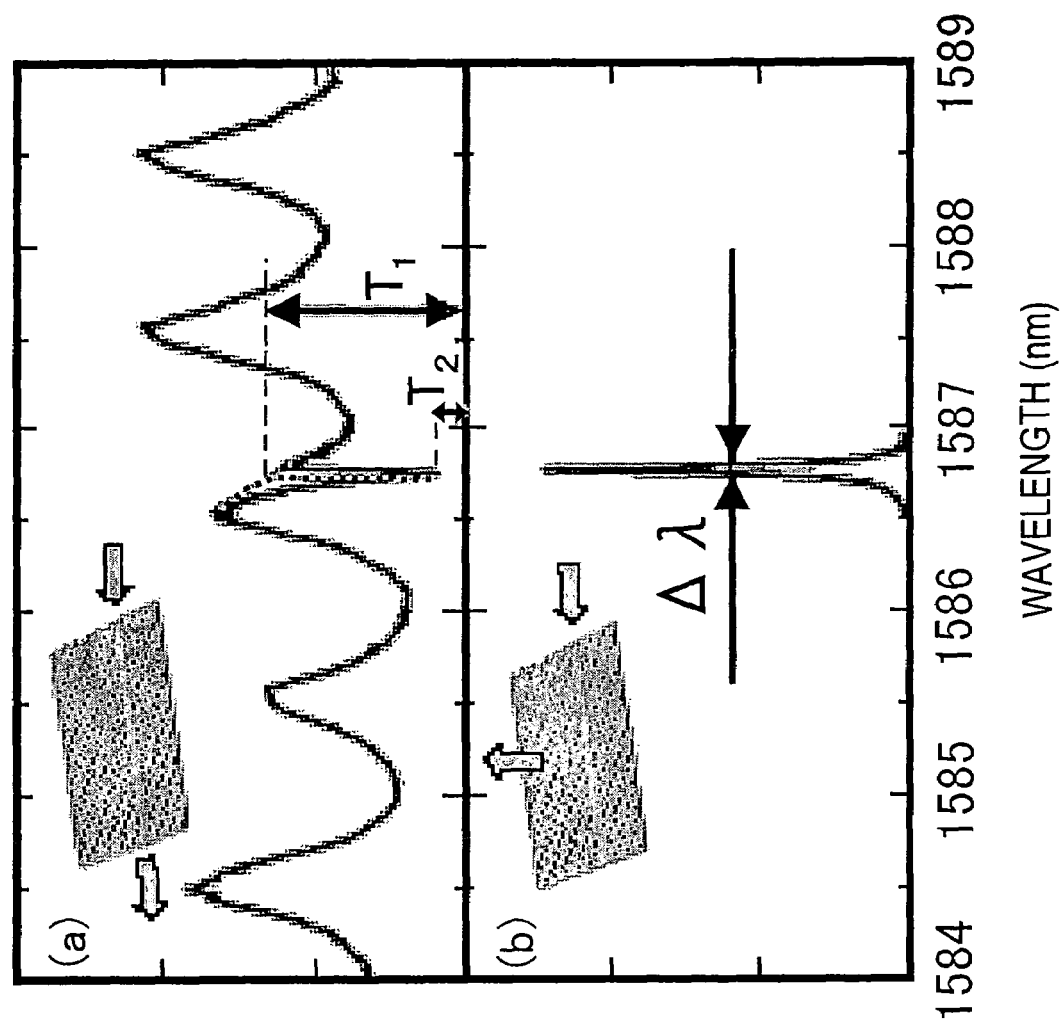
FIG. 11 is a graph showing the light transmission characteristics of a photonic crystal device, as described in Y. Akahane et al., "Fine-tuned high-Q photonic crystal nanocavity", OPTICS EXPRESS, vol. 13, No. 4 p. 1202, 2005.

On the other hand, FIG. 10B shows an example where a relatively large resist opening is formed, such that the resist opening contains not only the holes in the region interposed between the optical resonator 203 and the optical waveguide 202 but also holes in regions other than the aforementioned region. In this case, some of the holes which are present in regions other than the region in which the resist opening is interposed between the optical resonator 203 and the optical waveguide 202 are also made shallower than the holes which are covered by the resist mask. To be more specific, in the example shown in FIG. 10B, some of the holes which are located on the opposite side of the optical waveguide 202 from the optical resonator 203 may also have their depths reduced. However, this is not a problem because the optical waveguide 202 can properly function even in such a case.

Adjustment of the depths of holes which are contained in a relatively large region, as shown in FIG. 10B, can be easily realized even with a currently available lithography technique. For these reasons, the holes to be made relatively shallow may be present in regions other than the region interposed between the optical resonator 203 and the optical waveguide 202.

(Embodiment 2)

Hereinafter, with reference to FIGS. 4A to 4D, photonic crystal devices according to a second embodiment of the present invention will be described. Embodiment 1 illustrates a photonic crystal device in which an optical resonator is provided in a position away from the optical waveguide. In a photonic crystal device of the present embodiment, an optical resonator is provided within the optical waveguide. An optical resonator which is provided within an optical waveguide will hereinafter be referred to as an "optical waveguide type resonator".

A photonic crystal device shown in FIG. 4A comprises: a substrate 201; a periodic structure portion 206 composed of holes 2050 periodically arrayed on the substrate 201; and an optical waveguide 202 provided on the substrate 201. The present embodiment is characterized in that, as shown in FIG. 4B, four holes 2051 are provided at an intermediate position in the optical waveguide 202, thus creating an optical resonator 203 in an intermediate position in the optical waveguide 202. Moreover, the holes 2051 formed in the optical waveguide 202 are made shallower than the holes 2050 in the periodic structure portion 206. By adjusting the depth of the holes 2051, the degree of coupling between the optical waveguide 202 and the optical resonator 203 is adjusted.

A photonic crystal device shown in FIGS. 4C and 4D differs from the photonic crystal device shown in FIGS. 4A and 4B in that two holes 2051 are provided in an intermediate position in the optical waveguide 202, thus creating the optical resonator 203. Otherwise, the photonic crystal device shown in FIGS. 4C and 4D and the photonic crystal device shown in FIGS. 4A and 4B have a similar structure.

(Embodiment 3)

Next, with reference to FIGS. 5A to 5D, photonic crystal devices according to a third embodiment of the present invention will be described.

Figure 5B:
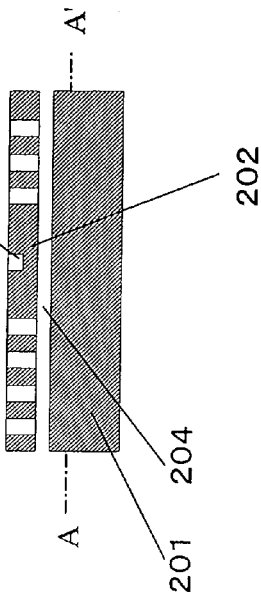
FIG. 5B is a cross-sectional view taken at line A–A' in FIG. 5A.
Figure 5D:
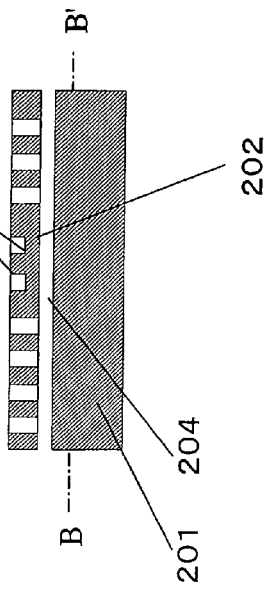
FIG. 5D is a cross—sectional view taken at line B–B' in FIG. 5C.
Figure 5A:
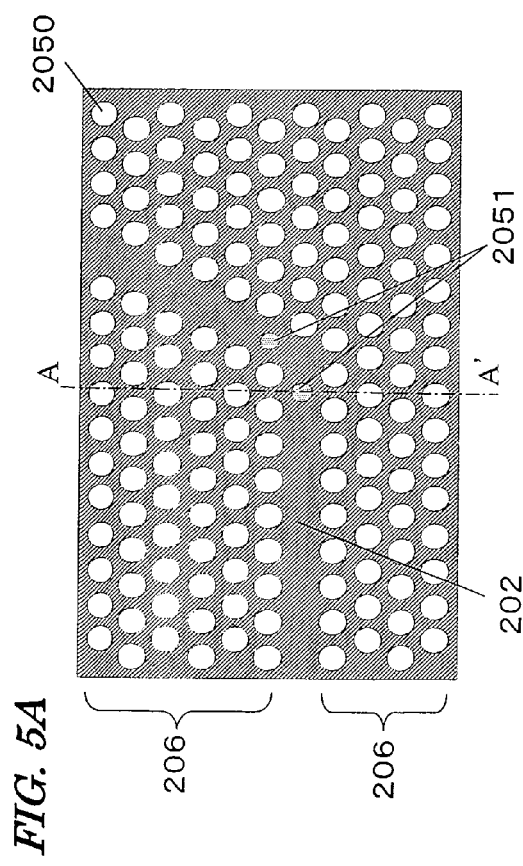
FIG. 5A is a plan view showing the structure of an optical waveguide in a photonic crystal device according to a third embodiment of the present invention.
Figure 5C:
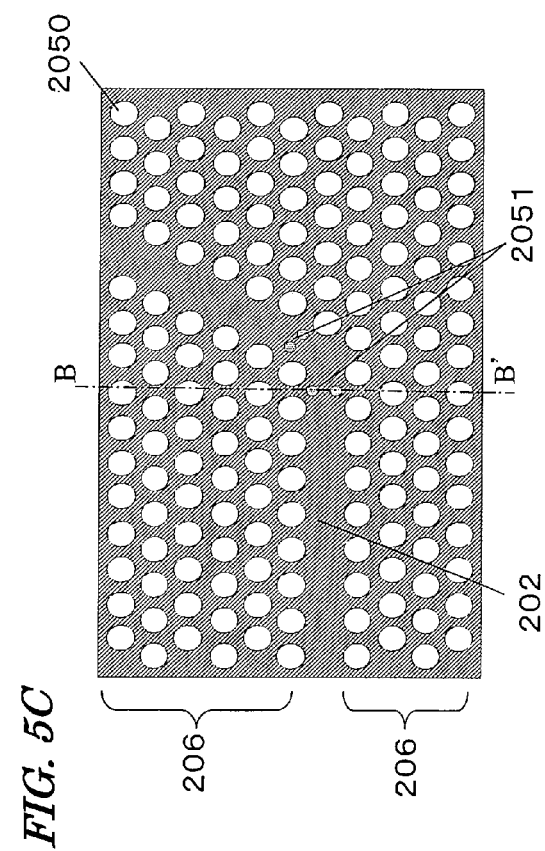
FIG. 5C is a plan view showing the structure of another optical waveguide according to the third embodiment.

In a photonic crystal device shown in FIGS. 5A and 5B, two holes 2051 are provided at a bent portion of an optical waveguide 202. On the other hand, in a photonic crystal device shown in FIGS. 5C and 5D, four holes 2051 are provided at a bent portion of an optical waveguide 202. In either photonic crystal device, the holes 2051 are made shallower than holes 2050 in a periodic structure portion 206. By adjusting the depth of the holes 2051, fine adjustment of the equivalent refractive index is realized. In the present embodiment, by adjusting the depth of the holes 2051, the transmission characteristics of the optical waveguide 202 are controlled.

(Embodiment 4)

Next, with reference to FIGS. 6A and 6B, photonic crystal devices according to a fourth embodiment of the present invention will be described.

Figure 6A:
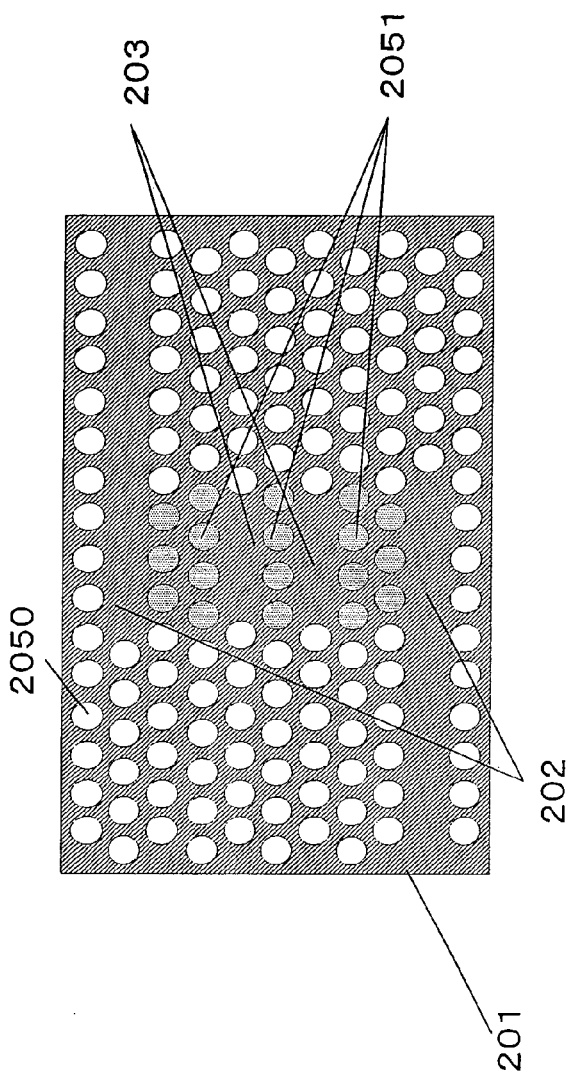
FIG. 6A is a plan view showing the structure of multiple optical resonators in a photonic crystal device according to a fourth embodiment of the present invention.
Figure 6B:
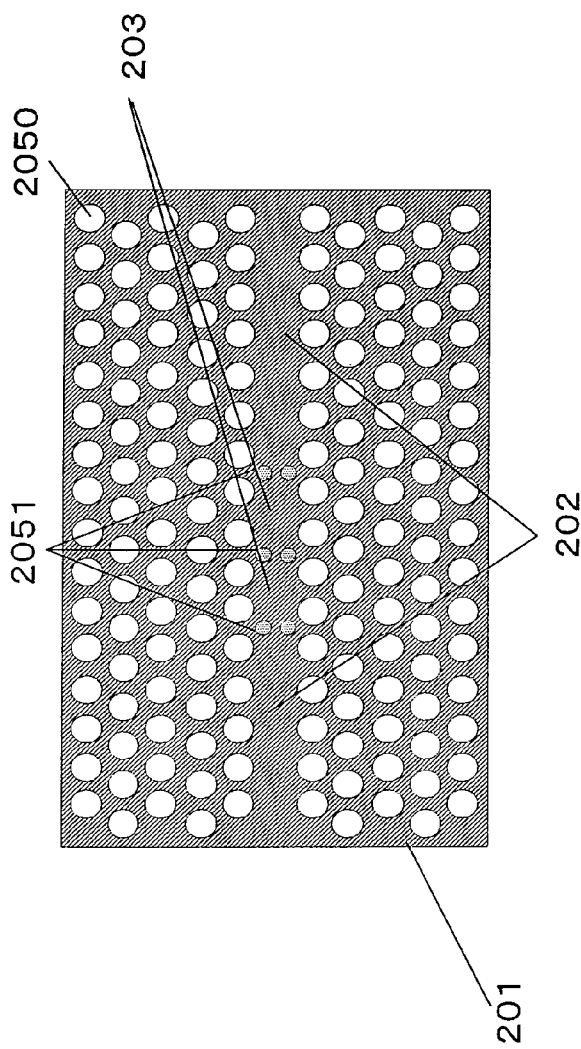
FIG. 6B is a plan view showing another multiple optical resonator structure.

FIGS. 6A and 6B show photonic crystal devices having a multiple optical resonator structure. In other words, a photonic crystal device of the present embodiment includes a plurality of optical resonators 203 which are coupled with one another. As in the optical resonator of Embodiment 2, each optical resonator 203 is composed of point defects in a photonic crystal.

Holes 2050 which are located in a region between adjoining optical resonators 203 are made shallower than holes 2051 in a periodic structure portion 206. By adjusting the depth of the holes 2051, not only the degree of coupling between the optical waveguide 202 and the optical resonator 203, but also the degree of coupling between the two optical resonators 203 is adjusted.

The ratio of the depth of the holes 2051 to the depth of the hole 2050 is prescribed to be in a range from 30% to 95%, for example, and, if necessary, in a range from 50% to 95%. The diameter of the holes 2051 is preferably ½ or less of the period with which the holes 2050 are arrayed (i.e., the lattice constant).

According to the present embodiment, the degree of coupling between the two optical resonators 203 can also be controlled to a desired level. As a result, it is possible to reduce ripples in the transmission band, thus improving the transmission characteristics.

(Embodiment 5)

Figures 7A, 7B:
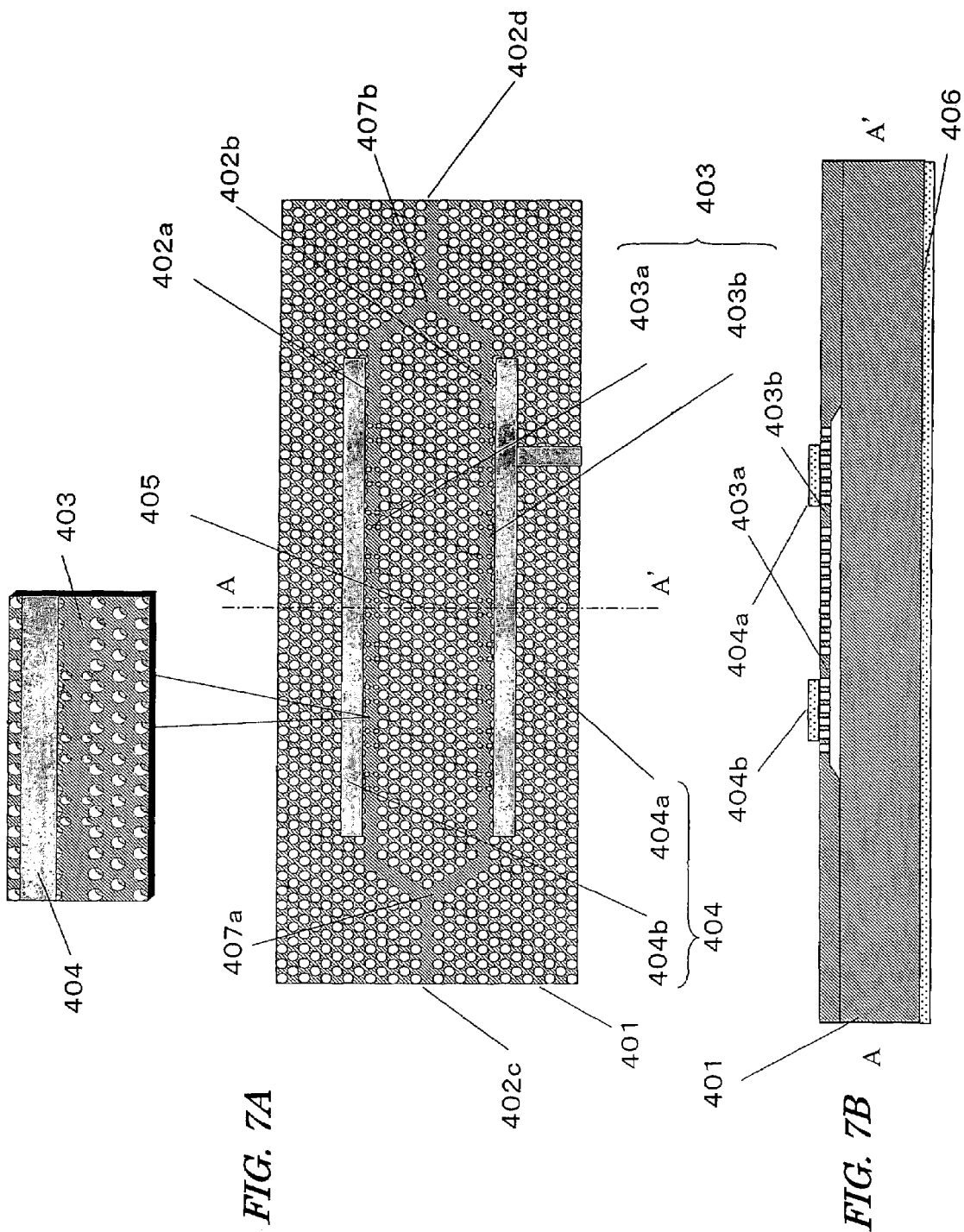
FIG. 7A is a plan view showing the structure of a photonic crystal device according to a fifth embodiment of the present invention (optical modulator).
FIG. 7B is a cross-sectional view taken at line A–A' in FIG. 7A.

With reference to FIGS. 7A and 7B, a photonic crystal device according to a fifth embodiment of the present invention will be described. The photonic crystal device of the present embodiment functions as an optical modulator of a Mach-Zehnder interference type.

In the optical modulator shown in FIG. 7, on the surface of a substrate 401 which has electrooptical effects (e.g., lithium tantalate ($LiTaO_3$) monocrystal, or lithium niobate ($LiNbO_3$) monocrystal), a periodic structure portion composed of a plurality of holes which are periodically arrayed is provided, thus forming a photonic crystal structure. On the surface of the substrate 401, an optical waveguide 402 is formed so as to be adjacent to the periodic structure portion. The optical waveguide 402 is composed of line defects in the photonic crystal.

The optical waveguide 402 is split into two optical waveguides 402a and 402b at two branch points 407a and 407b. Light which is input from an input-side optical waveguide 402c branches out at the branch point 407a so as to travel through the two branch optical waveguides 402a and 402b, and past the other branch point 407b, travels through a common output-side optical waveguide 402d. Thus, the optical waveguide 402 operates as an optical waveguide-based Mach-Zehnder interferometer.

In each of the split optical waveguides 402a or 402b, a plurality of optical resonators 403a or 403b are formed. The optical resonators 403a and 403b function to decrease the group velocities of the light propagating through the optical waveguides 402a and 402b, respectively.

On the substrate 401, modulation electrodes 404, which consist of two electrodes 404a and 404b and a ground electrode 406, are provided so as to extend along the branch optical waveguides 402a and 402b. The pair of modulation electrodes 404a and 404b together constitute a parallel coupled line which is designed so that odd modes are excited. The inner edges of the electrodes 404a and 404b are located immediately above substantially central portions of the branch optical waveguides 402a and 402b, respectively.

Each of the lines 404a and 404b of the modulation electrodes 404 is composed of a metal film (aluminum, gold, etc.) which is formed by a process such as vacuum deposition, photolithography, or etching.

As the interval between the modulation electrode 404a and the modulation electrode 404b decreases, the electric field(s) generated in the optical waveguide 402 becomes stronger. On the other hand, if the interval between the branch optical waveguide 402a and the branch optical waveguide 402b is too small, it becomes impossible to separate the light propagating through the branch optical waveguide 402a from the light propagating through the branch optical waveguide 402b, or vice versa. For this reason, it is preferable that the interval between the parallel portions of the branch optical waveguides 402a and 402b, i.e., the interval between the branch optical waveguide 402a and the branch optical waveguide 402b in an area where the modulation electrodes 404 are formed, is prescribed in a range from 2 µm to 20 µm. It is more preferable to prescribe this interval to be in a range from 5 µm to 15 µm.

In the present embodiment, an $LiNbO_3$ wafer which has been cut along a face (z plane) perpendicular to the z axis (direction of the principal dielectric axis) is used as the substrate 401. In the case where the device is to be used in a high frequency band, e.g., extremely high frequency, it is preferable to prescribe the thickness of the substrate 401 to be in a range from 50 µm to 300 µm, in order to suppress unwanted resonation of the electromagnetic field within the substrate 401. Instead of using a thin substrate 401, the thickness of a part of the substrate 401 may be reduced to 10 µm to 200 µm, thus suppressing unwanted resonation.

The input light is introduced from the input-side optical waveguide 402c, and when passing through the branch optical waveguides 402a and 402b, receives an optical modulation in the following manner.

When a modulation signal (high-frequency signal) is applied to the lines 404a and 404b of the modulation electrodes 404, electric fields occur in an air gap portion 405. Then, due to electrooptical effects, the refractive indices of the branch optical waveguides 402a and 402b change in accordance with the electric field intensity.

In the present embodiment, electric fields in opposite directions (along the vertical direction) are formed in the branch optical waveguide 402a and the branch optical waveguide 402b, so that the light propagating through the branch optical waveguide 402a and the light propagating through the branch optical waveguide 402b receive opposite phase changes. As a result, in the output-side optical waveguide 402d, an interference occurs between the two rays of light which have traveled through the branch optical waveguides 402a and 402b. Based on the presence or absence of such an interference, the intensity of the output light changes. Thus, the optical modulator of the present embodiment operates as an optical intensity modulator.

Due to the presence of the optical resonator 403 provided in the optical waveguide 402, the light propagating through the optical waveguides 402a and 402b resonates, and may possibly pass below the modulation electrodes 402 a plurality of times. As a result, optical energy is stored within the optical resonators 403a and 403b, whereby the modulation efficiency is improved. Since the group velocity of light is reduced by the optical resonators 403a and 403b, the modulation efficiency is further improved.

In the present embodiment, air holes having an adjusted depth are provided in the optical waveguide portion 402, thus forming the plurality of optical resonators 403a and 403b in the optical waveguides 402a and 402b. The degree of coupling between the optical waveguides 402a and 402b and the optical resonators 403a and 403b is controlled by adjusting the depth of the holes provided in intermediate positions in the optical waveguides 402a and 402b to a depth which is different from the depth of the holes for forming the photonic crystal structure.

Next, with reference to FIGS. 8A to 8E, an embodiment of a method for producing the photonic crystal device of the present embodiment will be described.

Figure 8A:
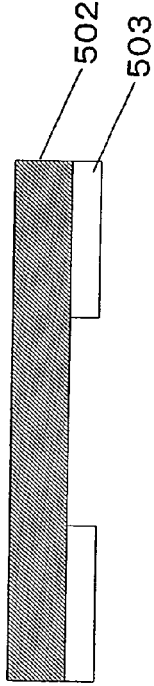
FIGS. 8A, 8B, 8C, 8D, and 8E are cross-sectional views showing production steps of an optical modulator shown in FIG. 7.

First, as shown in FIG. 8A, an $LiNbO_3$ substrate to function as an optical waveguide portion 502 of the substrate 401 is prepared. After this substrate is cleaned, a mask layer 503 composed of a photoresist is formed on the rear face of the optical waveguide portion 502. Any portion which is not covered by the mask layer 503 is a portion to be thinly etched in a subsequent etching step.

Figure 8B:
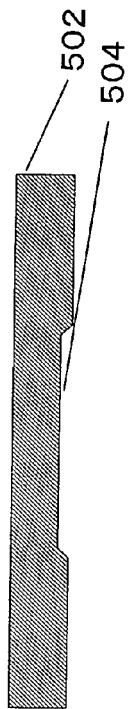

Next, as shown in FIG. 8B, a portion of the rear face of the optical waveguide portion 502 that is not covered by the mask layer 503 is etched, thus forming an air gap portion 504. This etching is performed by a dry etching using a fluorine type gas and an argon gas. After the etching, the mask layer 503 is removed.

Figure 8C:
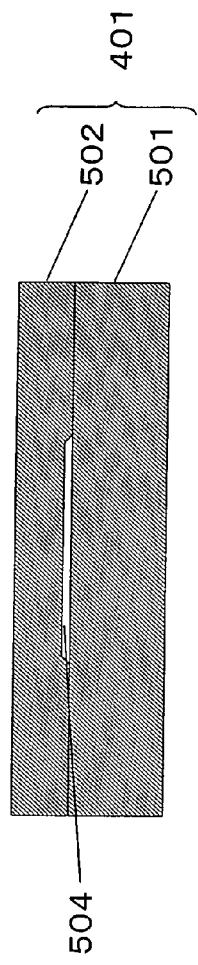
Figure 8D:
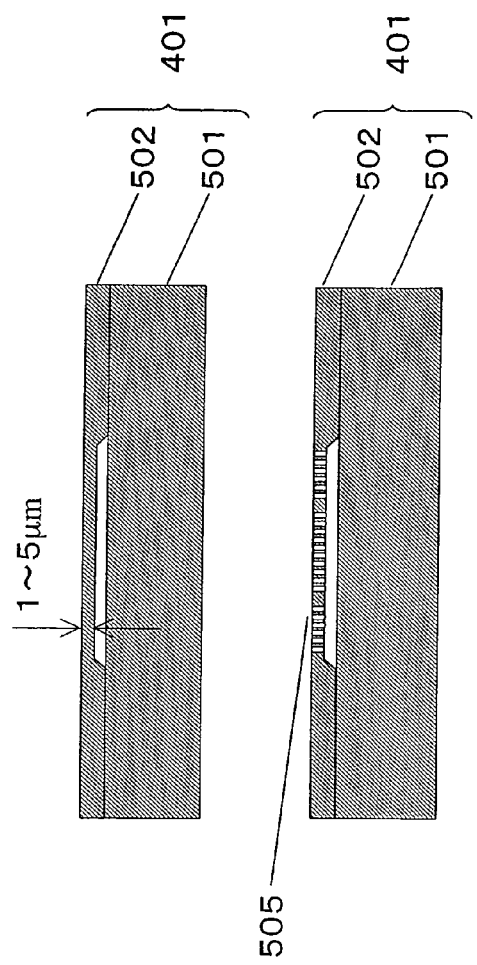

As shown in FIG. 8C, the rear face of the optical waveguide portion 502 is allowed to be in contact with the base portion 501, and thereafter the optical waveguide portion 502 and the base portion 501 are bonded together by a heat treatment. Thus, the substrate 401 shown in FIG. 7 is to be constituted by the waveguiding portion 502 and the base portion 501.

By performing an optical polishing or dry etching for the surface of the waveguiding portion 502, the thickness of the waveguiding portion 502 is reduced. As a result, the thickness of the waveguiding portion 502 located above the air gap portion 504 is decreased to about 3 µm. Preferably, the thickness of this portion is prescribed to be in a range from about 1 µm to about 5 µm.

Figure 8E:
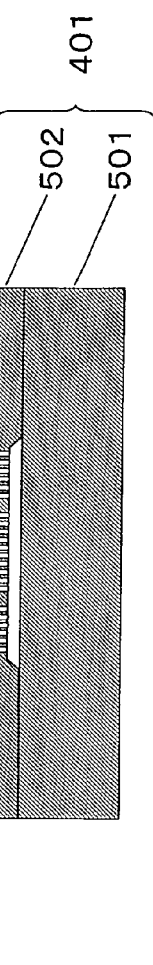

Next, as shown in FIG. 8E, a multitude of holes are formed in the waveguiding portion 502, thus forming a photonic crystal structure 505. The photonic crystal structure 505 can be produced by a method which has been described in any of the above embodiments.

The optical resonator in the present embodiment has a structure similar to that of the optical resonator 203 shown in FIG. 4A. In other words, the depth of the air holes in the optical waveguide is made different from the depth of the other air holes, whereby the degree of coupling of the optical resonator 203 is adjusted. Since the light transmission characteristics are affected by the aforementioned degree of coupling, its adjustment is highly important. In the present embodiment, the depth of the holes in the optical waveguide is adjusted by the aforementioned method, whereby the modulation efficiency can be improved while maintaining good transmission characteristics.

Note that the depth of the holes for forming the photonic crystal structure only needs to be a sufficient depth for allowing an electromagnetic field of light waves propagating through the optical waveguide to exist (e.g., 3 µm in this embodiment). It is desirable that the depth of the holes to be formed in the optical waveguide is 30% to 95% of the depth of the other holes.

Instead of utilizing the air gap in the substrate 401 shown in FIG. 7B to create a refractive index difference along a direction perpendicular to a principal face of the substrate, such a refractive index difference may be obtained by performing a Ti diffusion from the principal face of the substrate. Light confinement with respect to the direction perpendicular to the substrate surface is possible with a refractive index difference realized through Ti diffusion. However, since the former technique provides better light wave confinement, it is preferable to provide an air gap from the perspective of realizing good light confinement.

According to the present embodiment, the transmission band can be enlarged by providing a plurality of optical resonators in the optical waveguide portion. If the conventionally-proposed method which is based on the presence or absence of air holes is utilized for adjusting the degree of coupling of each optical resonator, there will be a problem in that the ripples in the transmission band are increased. In contrast, according to the present embodiment, the depth of the air holes is adjusted, so that the degree of coupling can be adjusted with a high accuracy, and the optical characteristics of the optical modulator can be improved.

The present embodiment realizes equivalent refractive index control based on differentiation of hole depths. In addition, the diameter, shape, and/or positions of the holes may also be differentiated. However, reducing the diameter of the holes would make it difficult to perform micromachining in the step of forming holes through photolithograpy and etching techniques.

Instead of forming physical recesses on the substrate, "holes" may be formed in the substrate by utilizing the property of an optical crystal such that its refractive index changes responsive to light (photorefractiveness). For example, if a lithium niobate crystal is irradiated with laser light of a wavelength of 532 nm and an output power of several hundred mW, the refractive index of the irradiated portion can be changed to a value which is different from the refractive index of the unirradiated portion. By utilizing such photorefractiveness to form holes with different depths in an optical crystal, a photonic crystal device according to the present invention can be produced.

A photonic crystal device according to the present invention can suitably be used as an optical modulator or a small-sized optical filter which is capable of operating with low power consumption. When an optical resonator in the photonic crystal device of the present invention is used as an optical resonator of a semiconductor laser, it is possible to lower the threshold value of laser oscillation. Thus, the photonic crystal device of the present invention substantially contributes to a decrease in size and an increase in efficiency of an optical communication system.

While the present invention has been described with respect to preferred embodiments thereof, it will be apparent to those skilled in the art that the disclosed invention may be modified in numerous ways and may assume many embodiments other than those specifically described above. Accordingly, it is intended by the appended claims to cover all modifications of the invention that fall within the true spirit and scope of the invention.

What is claimed is:

1. A photonic crystal device comprising:
   a substrate;
   a periodic structure portion formed in or on the substrate, the periodic structure portion having a plurality of holes arranged in a periodic array;
   at least one optical waveguide formed in or on the substrate, the at least one optical waveguide being adjacent to the periodic structure portion; and
   at least one optical resonator formed in or on the substrate, the at least one optical resonator being formed in a position away from the optical waveguide, with at least one of the plurality of holes of the periodic structure portion being interposed between the optical resonator and the optical waveguide,
   wherein the plurality of holes of the periodic structure portion include a hole having a depth different from a depth of the at least one hole interposed between the optical waveguide and the optical resonator.

2. The photonic crystal device of claim 1, wherein the plurality of holes of the periodic structure portion include a hole having a depth greater than a depth of the at least one hole interposed between the optical waveguide and the optical resonator.

3. The photonic crystal device of claim 1, wherein the plurality of holes of the periodic structure portion include a hole having a radius different from a radius of the at least one hole interposed between the optical waveguide and the optical resonator.

4. The photonic crystal device of claim 1, wherein a waveguiding portion is made of a material having electrooptical effects, the waveguiding portion being a portion of the substrate in which the optical waveguide is at least formed.

5. The photonic crystal device of claim 1, wherein the substrate includes: a waveguiding portion in which the optical waveguide is formed; a base portion supporting the waveguiding portion; and an air gap formed between the waveguiding portion and the base portion.

6. The photonic crystal device of claim 1, wherein the periodic structure portion forms a photonic band at a frequency of light propagating through the optical waveguide.

7. The photonic crystal device of claim 1, wherein,
   the optical waveguide is formed of a line defect in a photonic crystal, and
   the optical resonator is formed of a point defect in the photonic crystal.

8. The photonic crystal device of claim 1, further comprising modulation electrodes provided near the optical waveguide, and functioning as an optical modulator.

9. The photonic crystal device of claim 8, wherein the optical waveguide has a Mach-Zehnder interference type optical waveguide structure.

10. The photonic crystal device of claim 1, wherein, on a bottom face of the at least one hole interposed between the optical waveguide and the optical resonator, a film for reducing the depth of the hole is deposited.

* * * * *